Feb. 20, 1962 J. E. OLNEY 3,022,090
BOAT TRAILER HAVING IMPROVED FRAME MEANS
Filed June 28, 1960
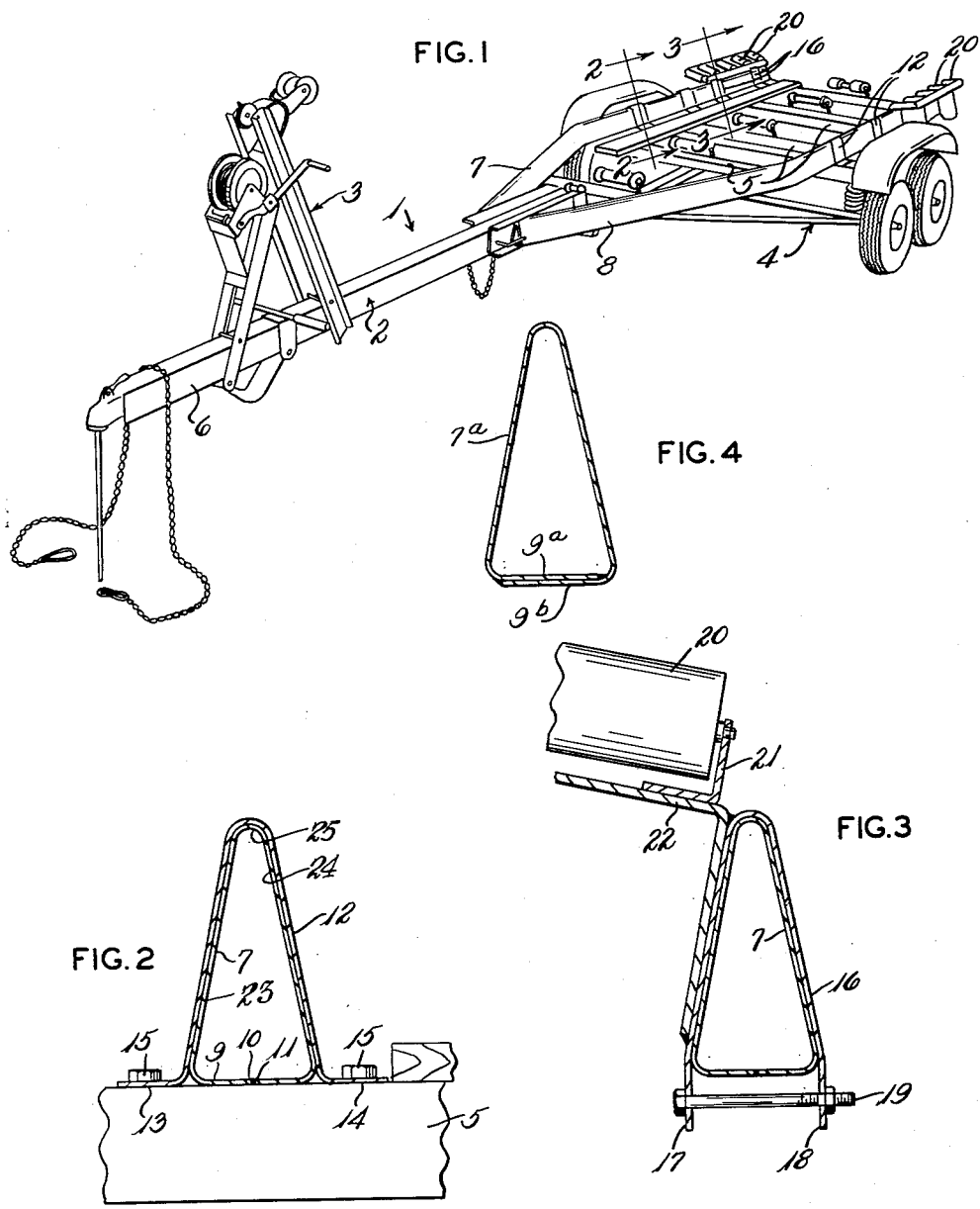
INVENTOR.
JAMES E. OLNEY
BY Oldham & Oldham
ATTYS.

United States Patent Office 3,022,090
Patented Feb. 20, 1962

3,022,090
BOAT TRAILER HAVING IMPROVED
FRAME MEANS
James E. Olney, Canfield, Ohio, assignor to Tee-Nee Trailer Company, Youngstown, Ohio, a corporation of Ohio
Filed June 28, 1960, Ser. No. 39,243
9 Claims. (Cl. 280—414)

The present invention relates to boat trailers, and especially to a boat trailer characterized by the provision of an improved, lower cost, sturdy frame means therein.

Heretofore there have been many different types of trailers provided for transporting boats from one place to another, and these various types of trailers have been made by different manufacturers both large and small in size, and in the number of trailers made and sold. Accordingly, the business of manufacture and sale of boat trailers is highly competitive, and it is very important that a strong, or sturdy boat trailer be made at minimum expense.

Many different types of boat trailers have been made heretofore that have used some type of a hollow tubular frame means therein wherein the frame might, for example, be of generally rectangular shape in section and which hollow tubular frame member had to be purchased from a steel manufacturing, or fabricating company, as it is made by special rolling and forming actions.

The general object of the present invention is to provide a novel and improved trailer having a novel, sturdy, improved frame member therein of generally triangular, or pyramidal shape in section.

Another object of the invention is to provide frame means for a boat trailer where the frame means can be made by relatively simple, uncomplicated equipment such as a stamping press, brake, or the like.

A further object of the invention is to provide an attractive, sturdy, generally triangular or pyramidal shaped hollow tubing made from less material than required in previous types of hollow tubular frames for boat trailers or the like but with the new tubing frame being equivalent in strength to prior types or styles of frame means.

Further objects of the invention are to provide novel and improved shape of clips or retaining straps that are used for securing frame means to the remaining portions of a boat trailer; to provide a boat trailer frame member that has a longitudinally extending seam in a base portion of the frame member and with the frame member being formed from a sheet of metal folded on its longitudinal axis and with the original edges of the metal sheet or strip being abutted in the base portion of the frame; to provide a boat trailer frame member that may have the abutted edges thereof welded together to further reenforce the frame member in the boat trailer; and to provide improved and different shapes of retainer or clamp straps in a boat trailer frame made at less cost than prior similar structures and which effectively secure members to a boat trailer frame to complete the trailer.

The foregoing and other objects and advantages of the present invention will be made more apparent as the specification proceeds.

Attention now is particularly directed to the accompanying drawings, wherein:

FIG. 1 is a perspective view of a boat trailer having novel frame means therein and illustrating the principles of the present invention;

FIG. 2 is an enlarged fragmentary vertical section taken on line 2—2 of FIG. 1;

FIG. 3 is a similar enlarged vertical section of the boat trailer of FIG. 1 taken on line 3—3 thereof; and FIG. 4 is a section of a modified type of frame member of the invention.

When referring to corresponding members shown in the drawing and referred to in the specification, corresponding numerals are used to facilitate comparison therebetween.

The present invention generally relates to a boat trailer including a running gear and frame means, and to the improvement comprising a frame member of generally triangular shape in section, said frame member being made from a metal strip the edges of which are abutted in said base to form a longitudinally extending joint in the frame member, substantially inverted V-shaped connector straps overlying said frame member and having end portions extending downwardly therefrom, bolt means engaging said end portions to secure said connector straps to said frame member, and boat support means secured to and carried by said connector straps.

Attention now is particularly directed to the details of the structure shown in the drawings, and the boat trailer of the invention is indicated as a whole by the numeral 1. This boat trailer includes frame means indicated as a unit by the numeral 2. The boat trailer 1 also includes a conventional winch assembly 3 carried by the frame 2 adjacent a forward portion thereof while a suitable running gear unit 4 is present in the boat trailer 1 and includes means, such as a cross bar 5. The running gear 4 is secured to the frame means in any substantially conventional manner including tie rods, support springs, etc. as desired.

In the present invention, the frame means 2 include a front section 6, and a pair of diverging frame members 7 and 8 suitably secured to the front section 6 of the frame means and diverging from such front section to form parallel lengths in the frame members 7 and 8 adapted for receipt of load on the boat trailer and for transferring such load onto the running gear 4 for conventional support action.

An important feature of the present invention is that the frame members 7 and 8 are formed of generally pyramidal, or triangular shape in vertical section from strips of metal that are folded upon their longitudinal axes. The corners formed in the frame members 7 and 8 are suitably radiused to avoid improper tearing or splitting of the metal strip and for good load transfer between the sides and base of the frame members. FIGS. 2 and 3 both clearly show that the frame members 7 and 8 have bases 9 that are substantially horizontally directed in the boat trailer with the original edges 10 and 11 of the metal strip from which the frame members are made being adjacent each other and usually abutted intermediate the margins of the frame member base 9. The frame members 7 and 8 also include upwardly converging sides 23 and 24, FIG. 2, that form a smoothly rounded apex 25 on the frame members. When desired, for strength purposes, these edges 10 and 11 can be welded together by conventional seam welding, or equivalent actions, but in many instances, the strength of the frame members 7 and 8 is sufficient without welding when made from the same gage metal as previous similar frame members for boat trailers where hollow frame means are provided of generally rectangular shape in section. These frame means or members 7 and 8 have the same or improved load carrying characteristics and strength as such prior structures and with the frame members of the invention being made from a reduced amount of metal strip. Furthermore, the shaping of the frame members 7 and 8 is a relatively uncomplicated action that can be performed, for example, on a stamping press or brake. Previous structures used in boat trailers have in most instances been rolled to a desired contour and this has required relatively expensive rolling equipment and with the action normally being performed by large manufacturers or fabricators of metal strips. The correlation in shape of the frame members 7 and 8 and the strap or connector means used to secure other means thereto is another feature of the invention to be described hereinafter in more detail.

FIG. 2 shows how the frame member 7 is carried on the upper surface of the cross bar and is affixed thereto, as by means of a securing strap 12. The securing, or connector strap 12 has laterally outwardly extending ears 13 and 14 formed thereon, which ears are adapted to lie adjacent to, or against the upper surface of the cross bar 5 and be secured thereto by anchoring means in a conventional manner, as by a bolt or cap screw means 15. The drawing brings out that the securing strap 12 is complementary in shape to the frame member 7 and is in good securing engagement therewith. Another feature of the invention is that the securing straps 12, for example, can be made in a relatively small stamping press with only one strike or hit on the bar being processed required to form the shape of the present invention, whereas prior constructions have required two or more hits of equivalent units to bend or shape them properly.

In FIG. 3, substantially inverted V-shaped connector straps 16 are shown overlying the frame member 7 and secured thereto. These connector straps 16 have end portions 17 and 18 that extend downwardly beyond the frame member 7 and are squeezed together, as by means of a bolt 19, to clamp or secure the connector straps 16 tightly to the frame member 7. Then any suitable member, such as a load support roller 20, can be journalled on a bracket 21 that is in turn suitably secured to or carried by the connector strap 16 through, for example, a positioning angle 22 secured between such members. Again, the connector straps 16 are of such a shape that they can be relatively easily fabricated in a stamping press or the like by only one shaping hit or impact being required thereon so that a savings is effected in the forming of the strap, as well as in the material required for forming this strap in relation to similar members used in prior types of trailer constructions.

Any desired boat or load support equipment, such as rollers, may be secured to the frame means 2, and any conventional coupling member is provided on the boat trailer 1.

It will be seen that the connector straps and means positioned thereon may be moved longitudinally of the frame means, and that the frame means is adjustable with relation to the running gear cross bar 5. The frame means may include only one center frame member, shaped like the frame member 7, or be of other known frame arrangements, as desired.

FIG. 4 shows a modified frame member 7a that has base portions 9a and 9b which are overlapped. The inner portion 9a preferably abuts on the vertically extending wall of the frame member to prevent twisting or reduction in base width of the hollow frame member. The overlapped base portions 9a and 9b may be spot welded, or be otherwise secured together at spaced portions thereof.

It will be realized that any suitable welding or securing action may be used on the bases 9, and 9a and 9b to hold them in fixed relation to each other.

By the present invention, a sturdy, improved type of frame means has been provided in boat trailers and sturdy support characterisitics are achieved accompanied by a reduction in costs. Material is eliminated in the frame without any sacrifice in load carrying capacity, or strength in the boat trailer assembly. The shape of the boat trailer frame means and the strap and connector members used in association therewith permit the provision of the same or improved quality of trailer construction at lower cost and with only simpler forming operations being required in the production of the boat trailer components. The actual boat manufacturer is able to form the frame members 6 and 7 and avoid paying for expensive rolling operations by other parties. Hence, it is believed that the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. In a boat trailer including a running gear and frame means, the improvement comprising a frame member of generally triangular shape in section having a base which is horizontally directed, said frame member forming a part of said frame means and being made from a metal strip the edges of which are abutted in said base to form a longitudinally extending joint in the frame member, substantially inverted V-shaped connector straps shaped complementary to and overlying said frame member and having end portions extending downwardly therefrom, said frame member having upwardly converging sides forming a rounded apex therefor, bolt means engaging said end portions to secure said connector straps to said frame member, and boat support means secured to and carried by said connector straps.

2. In a boat trailer, the combination including a running gear, a frame member of generally triangular shape in section having a base which is horizontally positioned, said frame member being made from a metal strip the edges of which are folded laterally inwardly to form said triangular shape, substantially inverted V-shaped connector straps overlying said frame member and having end portions extending downwardly therefrom, means engaging said end portions to secure said connector straps to said frame member, and boat support means secured to and carried by said connector straps.

3. A boat trailer as in claim 1 where the edges of the said metal strip are welded together to reenforce said frame member, and said connector straps are movable longitudinally of said frame member.

4. A boat trailer as in claim 1 where securing straps engage the said frame member and are complementary in shape thereto, a cross bar is provided as part of the running gear, said securing straps having outwardly extending ears formed in end portions thereof that overlie said cross bar, and means securing said ears to said cross bar to position said frame member thereon.

5. In a boat trailer, the combination including a running gear, a frame member of generally triangular shape in section having a base which is horizontally directed, said frame member being made from a metal strip the edges of which are adjacent in said base, said frame member having upwardly converging sides forming a rounded apex therefor, substantially inverted V-shaped connector means overlying said frame member and contoured complementary thereto, means engaging certain of said connector means to secure them to said frame member, anchoring means engaging certain of said connector means to secure them to said running gear, and boat support means operatively secured to and carried by certain of said connector means, said connector means being adjustable longitudinally of said frame member.

6. In a boat trailer including a running gear, a hollow frame member of closed generally triangular shape in section having a base which is horizontally directed, said frame member being made from a metal strip the edges of which are abutted in said base, substantially inverted V-shaped connector means overlying said frame member and contoured complementary thereto, means engaging certain of said connector means to secure them to said frame member, anchoring means engaging certain of said connector means to secure them and said frame member to said running gear, and boat support means secured to and carried by certain of said connector means.

7. In a boat trailer including a running gear, a hollow frame member of closed generally triangular shape in section having a base which is horizontally directed, said frame member being made from a longitudinally extending metal strip the edges of which are overlapped and secured together in said base, said frame member having upwardly converging sides and with one of said overlapped edges being limited in its overlapping position by contact with one of said sides, substantially inverted V-shaped connector means overlying said frame member and contoured complementary thereto, and anchoring means engaging certain of said connector means to secure them and said frame member to said running gear.

8. In a boat trailer including a running gear, a hollow frame member of closed generally triangular shape in section having a base which is horizontally directed and a pair of upwardly directed inwardly inclined legs, said frame member being made from a metal strip the edges of which are overlapped in said base and with one base edge being abutted against one of said legs, substantially inverted V-shaped connector means overlying said frame member and contoured complementary thereto, and anchoring means engaging certain of said connector means to secure them and said frame member to said running gear.

9. In a boat trailer including a running gear having a cross bar, a hollow frame member of closed generally triangular shape in section having a base which is horizontally directed, said frame member being made from a metal strip the edges of which are abutted in said base, said frame member having upwardly converging sides forming a rounded apex therefor, substantially inverted V-shaped securing means overlying said frame member and contoured complementary thereto to engage the converging sides and apex of said frame member, said securing means having outwardly directed end portions overlying said cross bar, and anchoring means engaging said end portions of said securing means to draw said securing means and said frame member towards said running gear and secure said frame member to said running gear.

References Cited in the file of this patent
UNITED STATES PATENTS

| | | |
|---|---|---|
| 2,066,019 | Swallow | Dec. 29, 1936 |
| 2,177,991 | Maddock | Oct. 31, 1939 |
| 2,494,115 | Bock et al. | Jan. 10, 1950 |
| 2,816,672 | Facchini | Dec. 17, 1957 |
| 2,881,023 | Gile et al. | Apr. 7, 1959 |

FOREIGN PATENTS

| | | |
|---|---|---|
| 636,080 | France | Jan. 9, 1928 |
| 1,161,487 | France | Mar. 28, 1958 |